United States Patent
Clements et al.

(10) Patent No.: US 9,296,160 B2
(45) Date of Patent: Mar. 29, 2016

(54) METHOD FOR MOVING WET OPHTHALMIC LENSES DURING THEIR MANUFACTURE

(75) Inventors: Julie Clements, Southampton (GB); Kevin Aldridge, Southampton (GB); Klaus Strotbeck, Schorndorf (DE); Klaus Straub, Backnang (DE)

(73) Assignee: CooperVision International Holding Company, LP, St. Michael (BB)

( * ) Notice: Subject to any disclaimer, the term of this patent is extended or adjusted under 35 U.S.C. 154(b) by 1650 days.

(21) Appl. No.: 12/558,424

(22) Filed: Sep. 11, 2009

(65) Prior Publication Data
US 2011/0062607 A1  Mar. 17, 2011

(51) Int. Cl.
| B65B 25/00 | (2006.01) |
|---|---|
| B65B 35/18 | (2006.01) |
| B65B 35/38 | (2006.01) |
| B29D 11/00 | (2006.01) |

(52) U.S. Cl.
CPC ........ *B29D 11/0024* (2013.01); *B29D 11/0023* (2013.01); *B65B 25/008* (2013.01); *B65B 35/18* (2013.01); *B65B 35/38* (2013.01)

(58) Field of Classification Search
CPC ........... B29D 11/0024; B29D 11/0023; B65B 5/105; B65B 25/008; B65B 35/18; B65B 35/38
USPC .................. 53/431, 471, 473, 247, 475, 246; 206/5.1; 264/2.6; 425/446
See application file for complete search history.

(56) References Cited

U.S. PATENT DOCUMENTS

| 5,094,609 | A | * | 3/1992 | Kindt-Larsen ..... B29D 11/0024 |
|---|---|---|---|---|
|  |  |  |  | 206/5.1 |
| 5,443,152 | A | * | 8/1995 | Davis ................ G01M 11/0278 |
|  |  |  |  | 206/5.1 |
| 5,561,970 | A |  | 10/1996 | Edie et al. |
| 5,578,331 | A |  | 11/1996 | Martin et al. |
| 5,607,642 | A |  | 3/1997 | Lepper et al. |
| 5,649,410 | A |  | 7/1997 | Martin et al. |
| 5,675,962 | A |  | 10/1997 | Martin et al. |
| 5,687,541 | A |  | 11/1997 | Martin et al. |

(Continued)

FOREIGN PATENT DOCUMENTS

| EP | 0 741 077 A2 | 11/1996 |
|---|---|---|
| EP | 0 741 079 A2 | 11/1996 |

(Continued)

OTHER PUBLICATIONS

International Search Report completed May 9, 2011 and mailed May 23, 2011 from corresponding International Patent Application No. PCT/US2010/047694, filed Sep. 2, 2010 (7 pages).

(Continued)

*Primary Examiner* — Stephen F Gerrity
(74) *Attorney, Agent, or Firm* — Klein, O'Neill & Singh, LLP (57) ABSTRACT

Methods, devices, and systems for moving wet ophthalmic lenses are described in which the ophthalmic lenses are first placed in wells of lens carriers and are centered by the structure of the wells. The carriers are then moved to a transfer module of a packaging system for transferring the ophthalmic lenses in blister packages. The transfer from the carriers to the blister packages are performed by a pick and place robot having pickup heads sized and configured for suctioning the ophthalmic lenses from the lens carriers.

5 Claims, 9 Drawing Sheets

(56) References Cited

U.S. PATENT DOCUMENTS

| | | | |
|---|---|---|---|
| 5,690,866 | A | 11/1997 | Andersen et al. |
| 5,706,634 | A | 1/1998 | Edwards et al. |
| 5,895,192 | A | 4/1999 | Parnell, Sr. et al. |
| 6,068,798 | A * | 5/2000 | Lesczynski et al. ........... 264/2.6 |
| 6,071,112 | A | 6/2000 | Calvin et al. |
| 6,180,032 | B1 | 1/2001 | Parnell, Sr. et al. |
| RE37,432 | E | 11/2001 | Martin et al. |
| 6,347,870 | B1 | 2/2002 | LaRuffa |
| 6,494,021 | B1 | 12/2002 | Schlagel et al. |
| 6,502,876 | B1 * | 1/2003 | Stockhorst ......... B29D 11/0024 294/1.2 |
| 6,558,584 | B1 | 5/2003 | O'Neill et al. |
| 6,994,386 | B2 | 2/2006 | Hagmann et al. |
| 7,319,133 | B2 | 1/2008 | Brame et al. |
| 7,426,993 | B2 | 9/2008 | Coldrey et al. |
| 7,652,756 | B2 | 1/2010 | Suppel-Adrian et al. |
| 2003/0024829 | A1 * | 2/2003 | Matsuzawa ...... B29D 11/00067 206/5.1 |
| 2004/0031701 | A1 * | 2/2004 | Peck et al. ..................... 206/5.1 |
| 2004/0074525 | A1 | 4/2004 | Widman et al. |
| 2005/0247580 | A1 * | 11/2005 | Hamilton ............. B65D 75/326 206/5.1 |
| 2007/0035049 | A1 | 2/2007 | Bruce et al. |
| 2007/0158865 | A1 | 7/2007 | Russell et al. |
| 2008/0100799 | A1 | 5/2008 | Newman |
| 2008/0257389 | A1 | 10/2008 | Daulton |
| 2008/0258322 | A1 | 10/2008 | Daulton et al. |
| 2009/0145086 | A1 * | 6/2009 | Reynolds ............... B65B 25/008 53/440 |
| 2009/0145091 | A1 * | 6/2009 | Connolly ............... B65B 25/008 206/5.1 |

FOREIGN PATENT DOCUMENTS

| | | |
|---|---|---|
| GB | 2 435 106 A | 8/2007 |
| WO | WO 00/13882 A1 | 3/2000 |
| WO | WO 03/089306 A1 | 10/2003 |
| WO | WO 2007/073936 A2 | 7/2007 |
| WO | WO 2007/143418 A2 | 12/2007 |

OTHER PUBLICATIONS

Written Opinion completed May 9, 2011 and mailed May 23, 2011 from corresponding International Patent Application No. PCT/US2010/047694, filed Sep. 2, 2010 (4 pages).

Extended European Search Report mailed Jun. 30, 2011 from corresponding European Application No. 10176037.9 (9 pages).

* cited by examiner

METHOD FOR MOVING WET OPHTHALMIC LENSES DURING THEIR MANUFACTURE

FIELD

The present invention relates to methods, devices, and systems for producing ophthalmic lenses, such as contact lenses. More specifically, methods, devices, and systems for moving wet ophthalmic lenses are described.

BACKGROUND

During the manufacture of ophthalmic lenses, including contact lenses, such as hydrogel contact lenses and silicone hydrogel contact lenses, a polymerizable lens-forming composition containing reactive ingredients is polymerized to form polymerized lenses. The polymerized lenses can be washed to remove un-crosslinked or partially crosslinked materials from the polymerized lenses to produce washed polymerized lenses. Washing steps can include contacting the polymerized lenses with alcohol or other organic solvents, contacting the polymerized lenses with aqueous liquids that may or may not contain alcohol or solvents, solutes, or combinations thereof. The washed polymerized lenses ultimately are provided in packages, such as blister packages, which are subsequently sealed with sealing elements and sterilized. In some processes, the washing is performed in the package, and in other processes, the washing is performed with polymerized lenses located in washing trays or carriers. Additional steps may include inspecting the lenses for defects prior to sealing the package.

When polymerized lenses are washed in washing trays or lens carriers, the lenses must be separately transferred to the lens packages so that one lens is placed in one package. Although these steps can be performed manually, in a commercial manufacturing process, many steps are automated.

SUMMARY

New methods, devices, and systems for producing ophthalmic lenses are described. The present methods, devices, and systems are useful in effecting the transfer of wet washed lenses from lens carriers to lens packages. With the present methods, devices, and systems, it is possible to improve the yield of a batch of lenses produced. For example, with the present lens carriers, a wet lens remains centered in a well of the carrier, which is useful in ensuring that the lens is accurately picked up by a wet lens pick up head and the number of missed wet lenses is reduced, compared to methods, devices, and systems in which different carriers are utilized. In addition, the yield can be improved by reducing damage to the wet lens resulting from the wet lens pick up head contacting and moving the wet lens. As another example, the yield of acceptable packaged lenses can be improved by reducing the amount of liquid transferred with the wet lens from the lens carrier well to the lens package, which is helpful in maintaining the target osmolarity of the packaging liquid in the lens package. Furthermore, with the present methods, devices, and systems, it is possible, if desired, to center the wet lens in the lens package, which can be useful during downstream inspection processes In one aspect, methods of manufacturing ophthalmic lenses are provided.

In another aspect, a lens carrier is provided.

In another aspect, a wet lens pick up head is provided.

Additional aspects and details of the present invention are also described by the following detailed description, drawings, and appended claims.

Various embodiments of the present invention are described in detail in the detailed description and claims below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION

Figure 1:
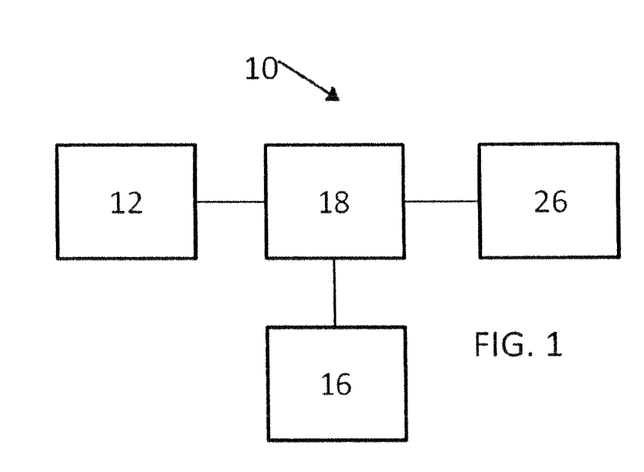
FIG. 1 is a schematic view of an exemplary ophthalmic lens packaging system provided in accordance with aspects of the present invention.

FIG. 1 is a schematic view of an exemplary ophthalmic lens packaging system provided in accordance with aspects of the present invention, which is generally designated 10. Broadly speaking, the system 10 comprises a number of modules having a number of devices and tools for performing, among other things, the function for transferring, moving, pushing, dosing, centering, and sealing trays and packages related to producing ophthalmic lenses in blister packages, such as those shown in FIG. 11 and FIG. 12. The system 10 is configured for placing ophthalmic lenses produced elsewhere from a production line or a plant into blister packages, also produced elsewhere from production line or plant and brought together with the ophthalmic lenses. Ophthalmic lenses usable with the system of the present invention include hydrogel contact lenses. A silicone hydrogel contact lens is a hydrogel contact lens that comprises a silicone component. Examples of silicone hydrogel contact lenses that can be packaged in the present packages include, but are not limited to silicone hydrogel contact lenses having the following U.S.

Adopted Names (USANs): lotrafilcon A, lotrafilcon B, balafilcon A, galyfilcon A, senofilcon A, comfilcon A, and enfilcon A. A non-silicone hydrogel contact lens is a hydrogel contact lens that is free of a silicone component. Examples of non-silicone hydrogel contact lenses that can be packaged in the present packages include hydrogel contact lenses having the following USANs: omafilcon A, ocufilcon A, ocufilcon B, ocufilcon C, ocufilcon D, ocufilcon E, methafilcon A, and methafilcon B, among others.

The system 10 comprises a plurality of modules each configured to perform one or more tasks to place ophthalmic lenses produced elsewhere from a production line or a plant into blister packages, also produced elsewhere from a production line or plant. In one exemplary embodiment, the system 10 comprises an infeed tray loading module 12 for feeding and moving rows of infeed trays containing blister packages configured for receiving contact lenses. As further discussed below, the trays each comprise a plurality of cavities having a blister package disposed therein for receiving an ophthalmic lens. The system further includes a transfer module 18 comprising a robot arm for picking up ophthalmic lenses supplied by an infeed transfer tray loading module 16. The loading module 16 may comprise a transferring system for moving a plurality of transfer trays comprising a plurality of ophthalmic lenses to the transfer module 18 for pickup, as further discussed below. Finally, an offload module is provided 26, which includes inspecting, transferring, and sealing components for completing the packaging process. However, the system is not limited to the modules expressly disclosed and a person of ordinary skill in the art may modify the system to remove, add, or substitute different modules to complete a packaging system for placing individual ophthalmic lenses into individual lens packages.

Figure 2:
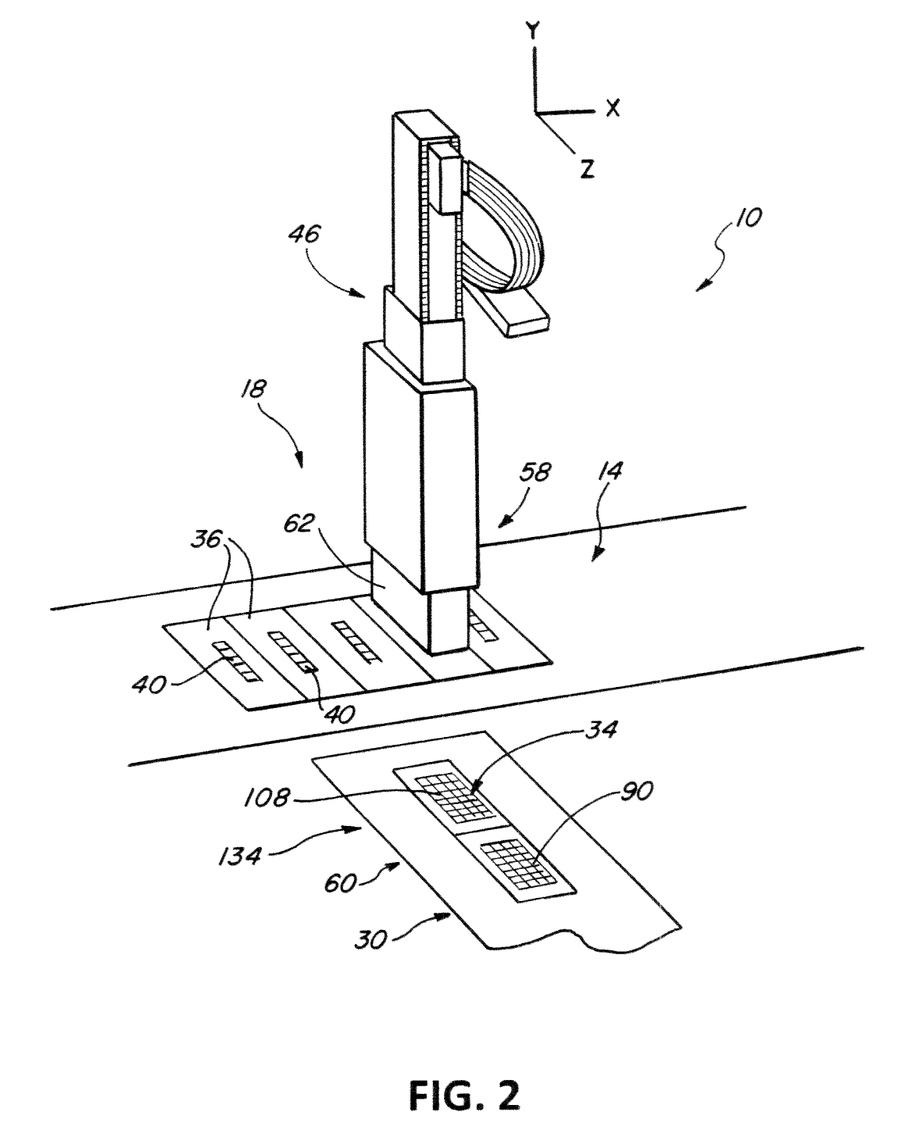
FIG. 2 is a schematic view of a transfer module, which is a sub-component of the system of FIG. 1.
Figure 2A:
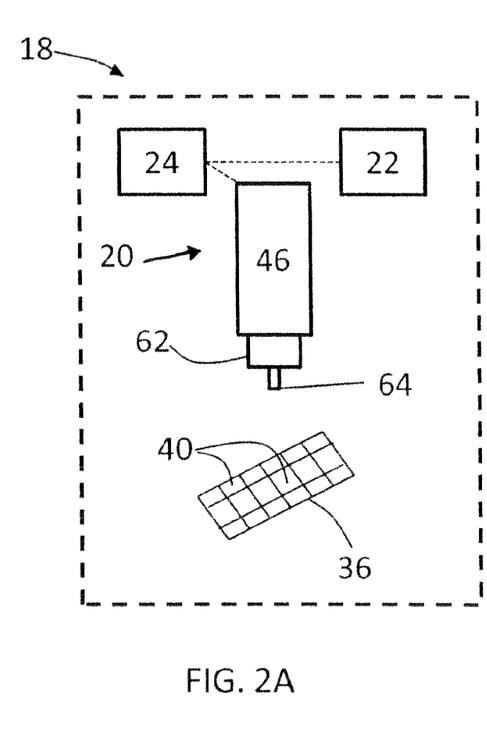
FIG. 2A is a schematic view of the transfer module of FIG. 1, which shows additional features of an exemplary pick and place system.

Referring now to FIG. 2A, an exploded schematic view of the transfer module of FIG. 1 is shown, which comprises a pick and place system 20 for picking up ophthalmic lenses and placing them in individual blister packages 40 that are located in infeed trays 36, as further discussed below. The pick and place system 20 comprises a robot arm 46; a motor 22 to move the robot arm 46 and other pick and place components, such as belts, gears, connectors; an end effector 62, and a plurality of pickup heads 64; and one or more controllers 24. As used herein, the term "pick and place robot" is understood to mean a controllable robotic arm that is movable to pick up and lower ophthalmic lenses.

Figure 10:
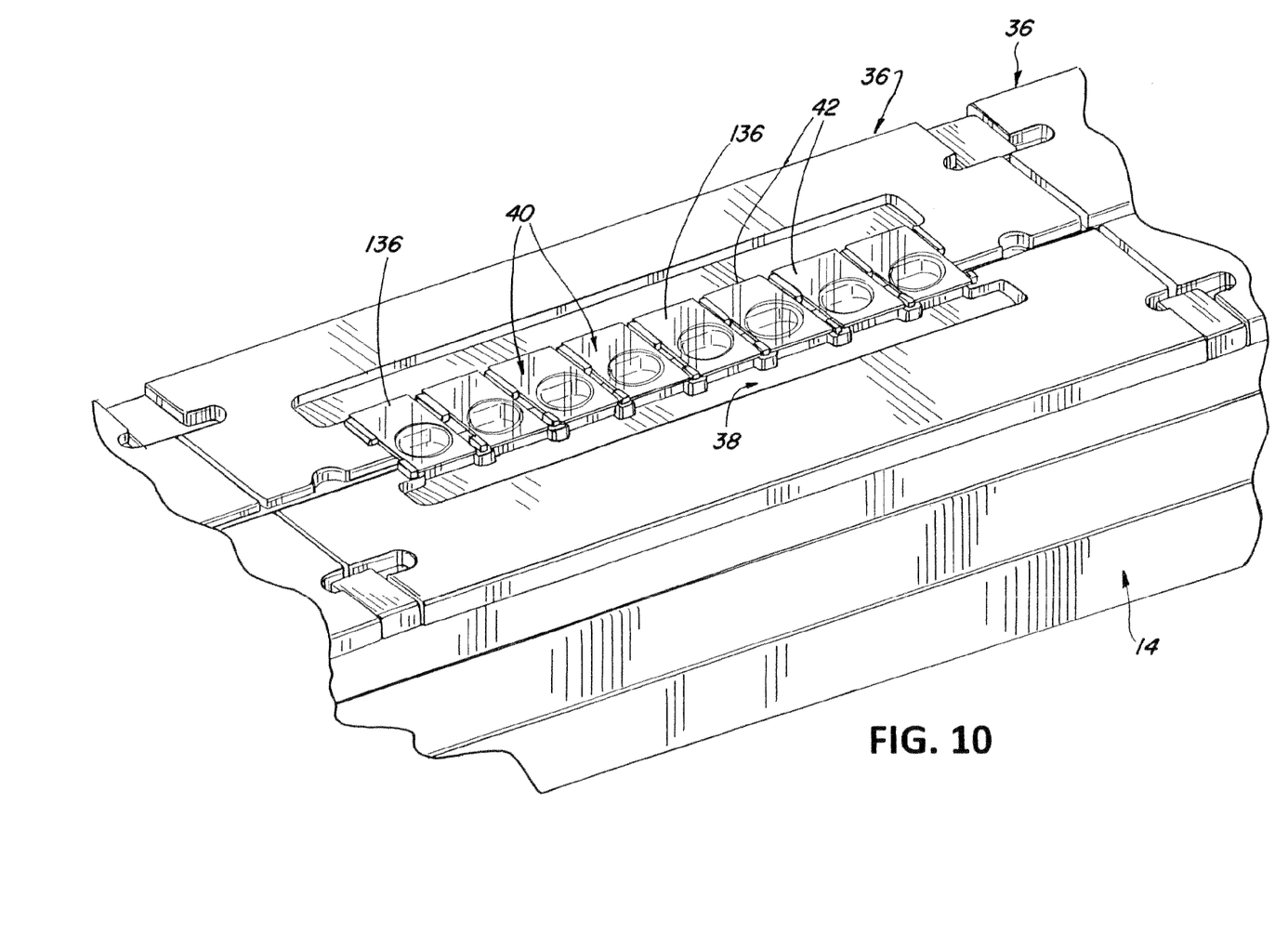
FIG. 10 is a perspective view of an infeed tray moving on a conveyor module and carrying a plurality of blister packs.

Referring now to FIGS. 2 and 10, a schematic view of the transfer module 18, conveyor module 14, and transfer cart 30 is shown. The conveyor module 14 is configured to move a plurality of infeed trays 36 (FIG. 2) or a continuous set of infeed trays 36 (FIG. 10) through the system for processing. The infeed trays 36 each comprises a storage area 38 (FIG. 10) for accommodating blister packs 40. In a particular embodiment, eight slots 42 are formed in a 1×8 arrangement or array in the storage area 38 to receive eight blister packs 40 with higher or lower array number being contemplated. The infeed trays 36 may be made from a metal such as hard anodized steel or aluminum. In other embodiments, the infeed trays are made from a thermoplastic material, such as polypropylene or polyethylene and the like.

Any number of blister packs may be used with the infeed trays 36 of the present invention. In one embodiment, the blister packs (FIG. 11) are each formed with a holding cavity 52 having a spherical distal section 54 and a non-spherical tapering proximal section 56. The cavity 52 is sized and shaped so that when it is filled with packing solution and an ophthalmic lens is placed therein, the shape allows the placed lens to self-center itself within the cavity. This in turn facilitates inspection and other processes that rely on the lens being centered relative to the cavity. The blister pack 40 further includes a flange 58, which is configured for mating with a peelable seal layer (not shown), and optional raised bumps or protrusions 60 for gripping purposes as well as aesthetic appeal. Another embodiment of the present blister packs is illustrated by the blister pack of FIG. 12, in which the blister pack 300 comprises, consists or, or consists essentially of a plastic base member, similar to the blister pack 40 described above, which base member comprises a cavity 303 for storing a hydrogel contact lens and a packaging liquid, as understood by persons of ordinary skill in the art.

The pick and place robot 46 is programmed to traverse along the z axis Co move between a first working envelope or area 58 and a second working envelope or area 60. The first working envelope is understood to cover a general area that is above one or more infeed trays 36 and the second working envelope is understood to cover a general area that is above one or more transfer trays 34. Thus, as described herein, the pick and place robot 46 is configured to move from between the second working area 60 to pick up a set of ophthalmic lenses and the first working area 58 to place the ophthalmic lenses in corresponding blister packs 40. An additional embodiment of the present system includes a pick and place robot 46 that can move along an x-z plane, x axis, and/or y axis.

Movement along the y axis enables the pick and place robot 46 to raise and lower its end effector 62 when located at the first working envelope or the second working envelope. This in turn allows the robot to apply a vacuum to the end effector to pick up a plurality of ophthalmic lenses or deactivate the vacuum to drop the ophthalmic lenses into corresponding blister packs, as further discussed below.

Figure 3:
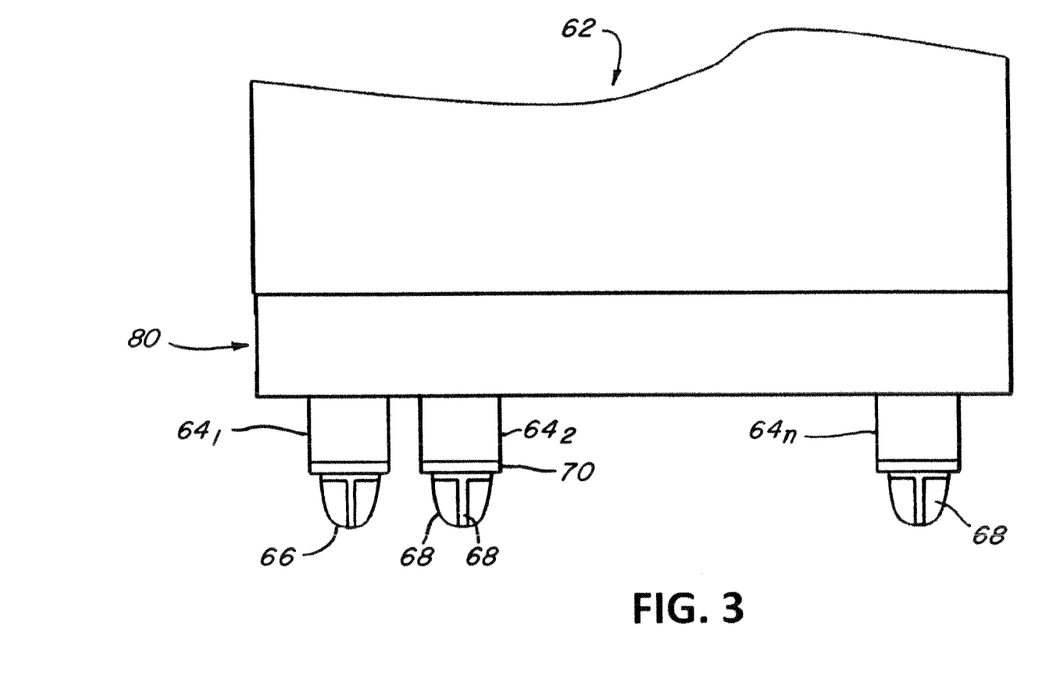
FIG. 3 is a schematic partial front view of an end effector located at an end of the pick and place robot of FIG. 2.
Figure 4:
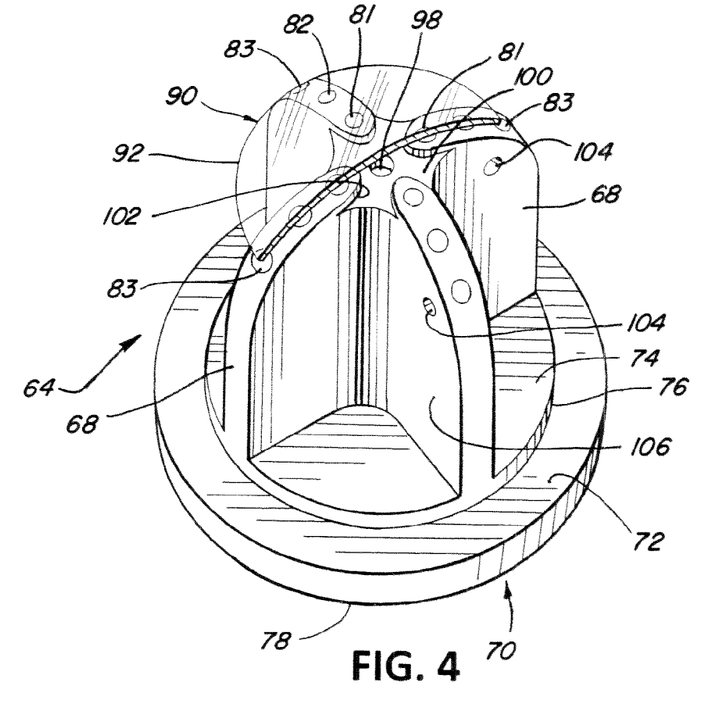
FIG. 4 is a perspective view of a pickup head mountable on the end effector of FIG. 3.
Figure 5:
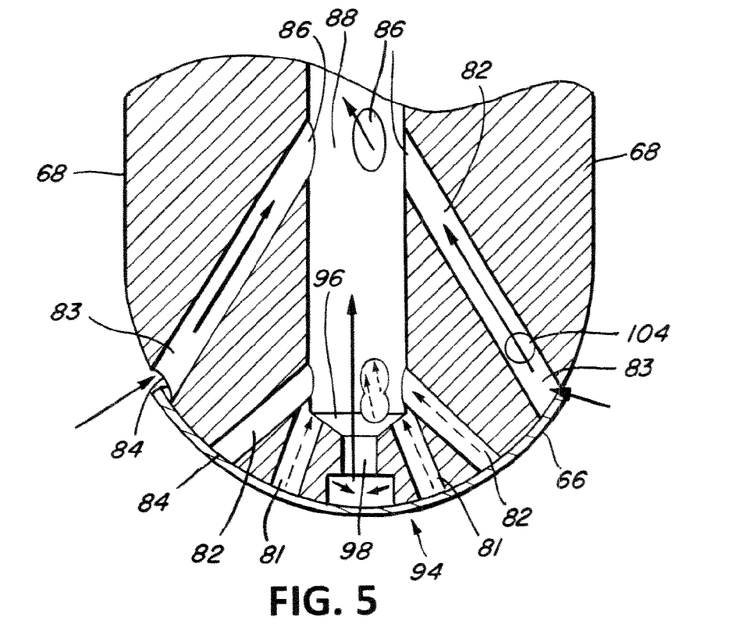
FIG. 5 is a cross-sectional side view of the pickup head of FIG. 4.

Referring now to FIGS. 3-5 in addition to FIG. 2, pickup heads 64 are shown incorporated on an end effector 62 for picking up ophthalmic lenses. In one embodiment, eight individual pickup heads $64_{1-n}$, (where n is any integer greater than 1) are incorporated on the end effector 62 for picking up eight ophthalmic lenses in a single pickup operation. The number of pickup heads 64 located on the end effector 62 should correspond with the number of cavities in the transfer trays 34 and infeed trays 36, which corresponds to the number of ophthalmic lenses to be picked up per transfer operation, as further discussed below. The pickup heads 64 may each be made from 316 stainless steel and comprises an arcuate end profile 66 that approximately matches a base curve of an ophthalmic lens to facilitate an approximate size-on-size fit when the pick up head picks up the ophthalmic lens. In a particular embodiment, the pickup head 64 incorporates four intersecting tabs or wings 68 resembling a plus "+" sign when normally viewed along the pick up head's distal end and its longitudinal axis (i.e., the end that contacts the contact lens). The wings are preferably equally spaced from one another and in a most preferred embodiment are at right angle to one another. However, fewer wings, such as, for example, three, or more than four wings may be incorporated, such as, for example, five wings. In one embodiment, the wings are equally spaced from one another.

The wings 68 are formed with a flange 70, which has an enlarged flange section 72, a reduced flanged section 74, and a shoulder 76 located therebetween. A threaded bore is incorporated on the upper surface 78 of the flange 70 to threadedly engage the pickup head 64 with a threaded male stem projecting from the header connector block 80 (FIG. 3), which is part of the end effector 62. However, a reverse arrangement in which a threaded male stem is incorporated on the pickup head 64 and a threaded bore on the connector block 80 is possible, as well as other connecting means for connecting the pickup head to the header connector block, without deviating from the spirit and scope of the present invention.

With specific reference now to FIGS. 4 and 5, each wing 68 incorporates a plurality of radial bores 81-83 each having two ends that terminate in openings. The bores are configured to produce negative pressure or vacuum to enable the pickup head 64 to pick up an ophthalmic lens, as further discussed below. A first or exterior opening 84 of each bore is located at the end profile 66 of the wing 68 and a second or interior opening 86 is located along a central bore 88. In one embodiment, three radial bores 81-83 are formed in each wing 68 with each bore having the same interior diameter. In another example, the bores are sized to produce generally similar vacuum at the exterior openings 84 so that a similar level of negative pressure is applied on the ophthalmic lens from all openings. In one embodiment, the bores generally decrease in diameter from the outer most bore 83 towards the inner most bore 81 due to a decrease in bore length, which produces less pressure drop and therefore has a relatively smaller diameter. In another embodiment, the bores have constant diameters along their length.

The central bore 88 generally runs longitudinally from the inlet to the threaded bore (not shown), where the pickup head 64 connects to the header connector block 80, and extends through the intersection of the four wings 68. In one embodiment, at the terminal or distal end 94 of the central bore 88, a reducer 96 is incorporated to provide a large pressure drop across a central exterior opening 98 of the central bore. The exterior openings 84 cooperate to pick up an ophthalmic lens when a vacuum source is supplied to the central bore 88, as further discussed below. The central bore 88 functions as a vacuum header to the plurality of radial bores 81-83. In one embodiment, the central bore 88 is sized about 2.5 times to about 4 times larger in diameter than the largest radial bore.

In the example shown in FIG. 5, the three exterior openings 84 are equally spaced along the outer periphery 66 of each wing, but other configurations are possible. As shown in the example of FIG. 4, centrally, an undercut area 100 is provided by forming a lip 102 at the inner end of each wing 68. As the central opening 98 terminates in the undercut area 100, it is recessed from the inner most openings 84 of the inner most radial bores 81. This allows the central opening 98 to suction areas and surfaces in the undercut area of the pickup head 64 and not simultaneously come in contact with the surface of an ophthalmic lens as with the other openings 84 of the wings 68, as further discussed below. As used herein, the words "recess" or "recessed" are understood to mean away from or offset from the same general plane or contour of another item or structure.

Also shown in partial cut-away view in FIG. 4 is an ophthalmic lens 90, which has an outer periphery 92. In one embodiment, the outer most openings 84 of the four wings 68 are sized and placed so that when the pickup head 64 picks up the ophthalmic lens 90, the lens periphery 92 is recessed from the outer edges of the four outer openings 84. Thus, the outer openings 84 will not be completely shielded or covered by the ophthalmic lens when vacuum is applied. This allows the pickup head 64 to both lift the outer perimeter of the ophthalmic lens and suction fluids around the lens during a pick up operation, as further discussed below. In another embodiment, the outer most openings 84 are sized and placed so that they are recessed from the outer periphery 92 of the ophthalmic lens 90 and be covered by the lens. However, as the central opening 98 is recessed from the inner openings 84, it is not sealed or directly covered by the posterior surface of the lens when suction is applied. As such, fluids and possibly particles from unreacted or partially reacted monomers may be drawn away by the central opening 98 irrespective of whether the outer openings are covered or not.

In one embodiment, pluralities of bypass openings 104 are incorporated along a side wall 106 of one or more wings 68. With reference to FIG. 5 in addition to FIG. 4, each bypass opening 104 is formed along the path of the outer most radial bore 83 and is in communication with the radial bore. The bypass openings 104 are thus recessed from the end profile 66 of the pickup head 64 and in the embodiment shown, are located along a plane orthogonal to a plane defining the central opening 98. In this embodiment, because the bypass openings 104 and the central opening 98 do not come in contact with a lens surface, they have open ends that enable the pickup head to draw away fluids and the like. Accordingly, an aspect of the present invention is a pickup head comprising a plurality of openings, a subset of said openings being configured to suck a common surface of an ophthalmic lens and the remaining number of said openings being configured to suction fluids and possibly suspended solids from a tray cavity during a pickup operation, as further discussed below. The pickup head provided herein is also understood to provide spaced apart suction areas defined by interior suction openings formed along a plug shape area and wherein a different set of openings are available to provide a continuous negative pressure. From the description, the pickup head is also understood to provide a contoured outer periphery sized and shaped to form a spherical fit with the posterior lens surface of an ophthalmic lens.

Figure 6:
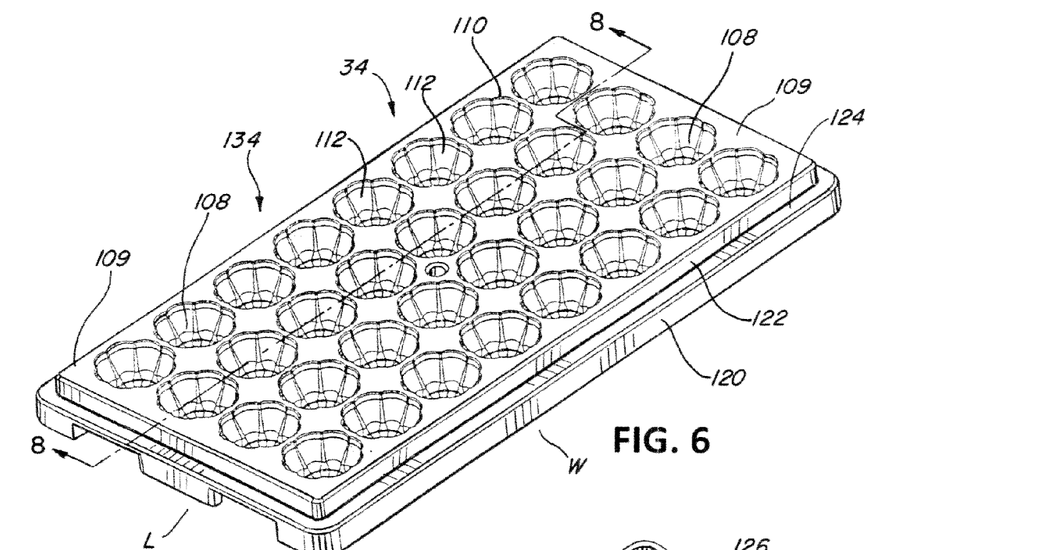
FIG. 6 is a perspective view of a transfer tray usable to transfer ophthalmic lenses in accordance with aspects of the present invention.

With reference now to FIG. 6, a perspective view of a transfer tray or lens carrier 34 provided in accordance with aspects of the present invention is shown. As previously discussed with reference to FIG. 2, the transfer tray 34 is configured to temporarily store ophthalmic lenses following a delensing step, or a washing step, such as a hydrating step, or a combination hydrating/extracting step. Although robots or other assemblies may be used to transfer the ophthalmic lenses into the cavities of the transfer tray, in one embodiment, the ophthalmic lenses are manually transferred to the transfer tray with the posterior lens surface or base curve facing the opening of the cavity. The tray 34 may be formed from a thermoplastic material, such as ATOFINA® polypropylene (Total Petrochemicals, Courbevoie, France) or other polypropylene resins, and is laid out in a 4×8 lens cavity array with smaller or larger arrays contemplated. More specifically, the tray 34 has a length L and a width W and is molded with a plurality of cavities or wells 108 aligned along the length and the width in a 4×8 array. In one embodiment, the wells depend from a substantially planar upper surface 109 in an equally spaced manner along the length and width. The cavities 108 are each sized and configured to hold a single wet ophthalmic lens and each has a receiving area configured to hold the posterior lens surface of the ophthalmic lens facing up and the anterior lens surface facing the bottom wall surface of the cavity.

Figure 8:
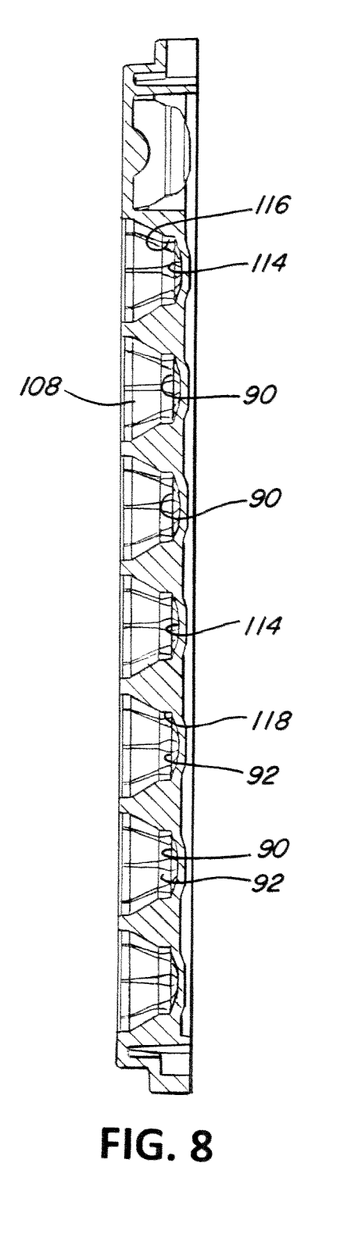
FIG. 8 is a cross-sectional side view of the transfer tray of FIG. 6 taken along line 8-8.
Figure 9:
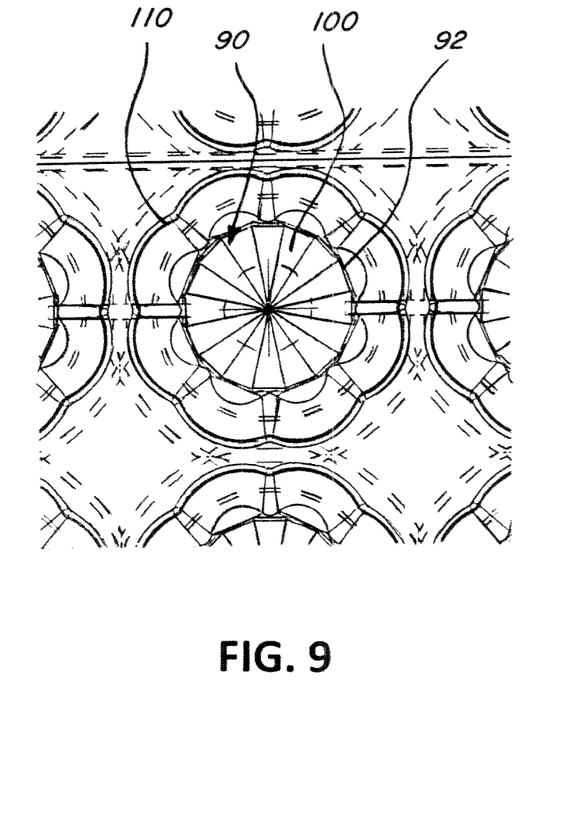
FIG. 9 is a partial blown up plan view of the tray of FIG. 6 showing details of the interior of a cavity.

With reference to FIG. 9 in addition to FIG. 6, the cavity 108 has an opening 110 defined by a perimeter having a multi-sided clover configuration, such as an eight leaf clover configuration. As shown in FIG. 8, which is a cross-sectional view of FIG. 6 taken along line 8-8, the cavity 108 tapers radially inwardly as it extends toward the cavity base 114. Thus, the interior surface 112 (FIG. 6) of the cavity 108 is both undulating and tapering. Internally, a cylindrical interior section 116 (FIG. 8) is formed by a generally square or perpendicular. i.e. non-tapered, wall 118, which is disposed below the tapered section of the cavity. A substantially spherical wall section forming the base surface 114 is disposed adjacent the generally square wall section 118. Thus, when an ophthalmic lens 90 is placed in one of the cavities 108, the interior contour of the cavity is structured to align the lens so that it sits centrally inside the cavity. In one embodiment, the lens cavities 108 are each filled with a sufficient amount of deionized water prior to placement of the ophthalmic lenses therein. When an ophthalmic lens is placed in one of the cavities, it sinks to the bottom of the cavity and is self-aligned by the structure of the interior wall surface 112. As shown in FIGS. 8 and 9, the periphery 92 of the ophthalmic lens 90 fits against the perimeter of the square wall section 118, near the transition with the bottom base 114. In one embodiment, the diameter of the square wall section is about 16 mm and the diameter of the ophthalmic lens is about 14.5 mm for a toric lens and about 14.0 mm for a spherical lens. In another embodiment, the diameter of the square wall section is about 0.1 mm to about 0.3 mm larger than the diameter of the ophthalmic lens to facilitate alignment to within a small tolerance. Thus, an aspect of the present invention is a transfer tray comprising a plurality of cavities formed in an array, said cavities each comprising an undulating surface and a tapering surface that tapers to a smaller diameter base surface for centering the ophthalmic lens. Another embodiment of the present invention is a system comprising a 1×8 array of cavities on a transfer tray, a 1×8 array of pickup heads on an end effector, and a 1×8 array of cavities on an infeed tray, wherein the spacing between two adjacent centers of the cavities of the infeed tray, the transfer tray, and the spacing between two pickup heads are generally the same, to within 0.1 to 0.3 mm.

Figure 7:
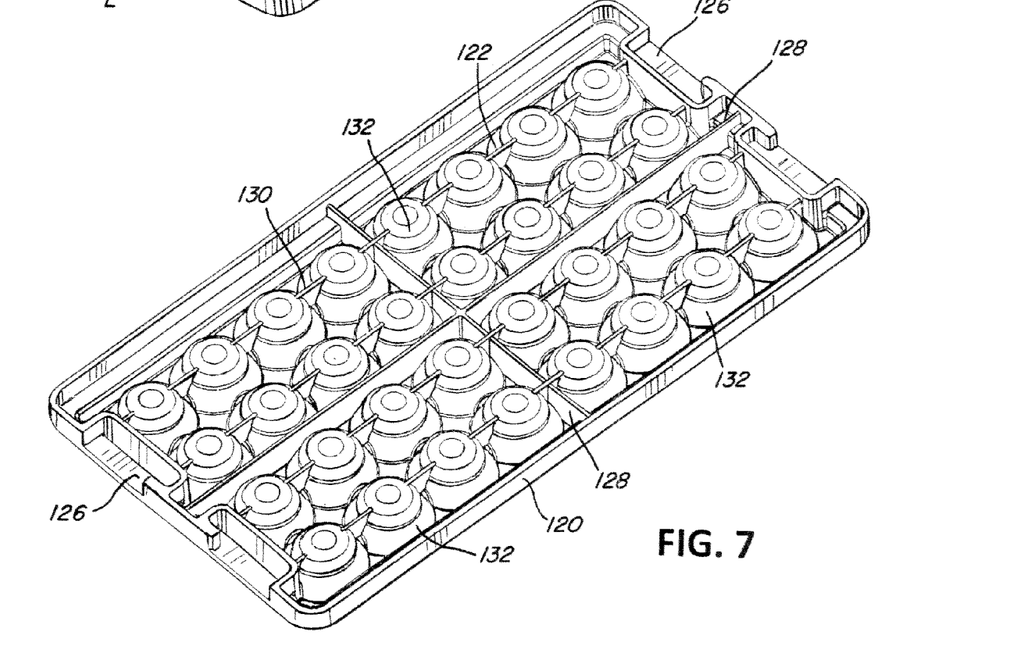
FIG. 7 is a perspective view of the transfer tray of FIG. 6 from a different viewing angle.

FIG. 7 is a bottom perspective view of the tray 34 of FIG. 6. As shown, the tray has an outer perimeter wall 120, a recessed outer perimeter wall 122, and a stacking area 124 (FIG. 6) formed therebetween. The stacking area 124 is configured to support another tray 34 placed thereon to form a stack of transfer trays 34. Also shown are four recessed areas 126 formed along the length of the tray. The recessed areas 126 are formed to facilitate alignment on the palettes 32 (FIG. 1). Typically the trays are arranged in a planar arrangement in a manufacturing line, such that each tray is adjacent each other without being stacked on each other. In some embodiments, the trays may be stacked on top of each other. Pluralities of ribs 128, 130 are incorporated to provide added structural rigidity and flatness for moulding purposes. The short ribs 130 are provided to connect adjacent exterior cavity wall surfaces 132 while the longer ribs 128 are provided to connect the outer perimeter walls 120, 122 together. In one embodiment, the wells or cavities 108 are about 27.3 mm on centers, the tray height is about 15 mm high, the tray width is about 243 mm wide, and the tray length is about 129 mm long. The well depth measured from the top surface 109 to the tray bottom surface or base 114 is about 13.57 mm.

The operation of the system provided herein may be understood as follows:

The thermoformed or injection molded transfer trays 34 are first prepared by placing transfer solution in the tray cavities 108. In one embodiment, the transfer solution can be deionized water, or an other aqueous solution, such as a saline solution, including a contact lens packaging solution. Ophthalmic lenses 90 are then manually placed in the cavities 108, one lens per cavity with the base curve (posterior surface) up, to form transfer ready trays 134, which is understood to mean trays with ophthalmic lenses placed therein. The trays may be placed in rows of one-stack high or in stacks of multiple trays, such as five-high or integers thereof.

The stack of transfer ready trays 134 are then moved over to the transfer module 18 (FIGS. 1 and 2), or transported over using a conveyor system or other means, such as by hand carry. The process may be a continuous process or a batch process. If a continuous process and a cart is used to transport the stacks of transfer ready trays 134 to the transfer module 18, care must be taken to ensure sufficient stacks of trays 134 are available at the second working area 60 for picking up by the pick and place robot arm 46 so as not to disrupt the continuous process.

The pick and place robot 46 is programmed to move between the first working area 58 and the second working area 60. In an exemplary sequence, the pick and place robot 46 moves along the x-z coordinate to move to the second working area 60 over a transfer ready tray 134. The pick and place robot 46 then lowers the end effector 62 (FIGS. 2 and 3) along the y axis towards the tray 134. The pickup heads $64_{1-8}$, being numbered and spaced a corresponding distance as the cavities 108 on the tray 134, are lowered into the cavities 108 and into the fluids contained in the cavities to pick up the ophthalmic lenses 90. Concurrently therewith or slightly before the pickup heads are lowered into the cavities, a vacuum is applied to the end effector 62, which places the header connector block 80 under vacuum and provides vacuum to each of the central bores 88 of the eight pickup heads 64.

With reference now to FIG. 5, as the pickup heads 64 are lowered into the cavities of the transfer ready tray 134, vacuum is generated and causes a negative fluid flow (e.g., gas and/or liquid) into each pickup head, indicated by the arrows. Since the cavities are filled to a predetermined level with liquid, the liquid is suctioned away by the vacuum. The pickup heads 64 pick and hold the lenses, one on each pickup head, out of the wet tray with vacuum still applied. The applied vacuum also extracts the deionized (DI) water out of the wet tray. In one embodiment, the robot 46 is programmed to move directly towards the tray and the pickup heads 64 sucking up the lenses before the liquid is completely emptied from the cavities. As such, residual liquid may remain in the cavities even after the end effector 62 is retracted away from the tray with the ophthalmic lenses suctioned to the ends 66 of the pickup heads 64.

With reference now to FIG. 4 in addition to FIG. 2, as the end effector 62 is retracted away from the transfer ready tray 134 and moved over to the first working area 58, vacuum applied to the pickup head 64 causes excess liquid on the surface of the ophthalmic lens to be sucked through the central opening 98 and the bypass openings 104 of the pickup head. Consequently, excess liquid present with the ophthalmic lens is removed from the ophthalmic lens by the vacuum at the central opening the bypass openings before being placed into a blister pack. This removal of the excess liquid allows the osmolarity of the final packaging solution, which can be, for example, a buffered saline solution, in the blister pack to be more effectively controlled by limiting the amount of transferred liquid, such as deionized water, to come in contact with and dilute the packaging solution.

Referring again to FIG. 6 in addition to FIG. 4, because the cavities 108 are structured to center the ophthalmic lenses 90 within each cavity and the spacing between each cavity is known, the robot 46 can be programmed to pick up the lenses with repeated accuracy. However, in the event an ophthalmic lens is misaligned so that it is off-centered when picked up by the pickup head 64, the bypass holes 104 and the central opening 98 on the pickup head allows the holes and opening to suction excess transfer liquid away from the lens surface so that it will not affect the osmolarity of the packaging solution.

Figure 11:
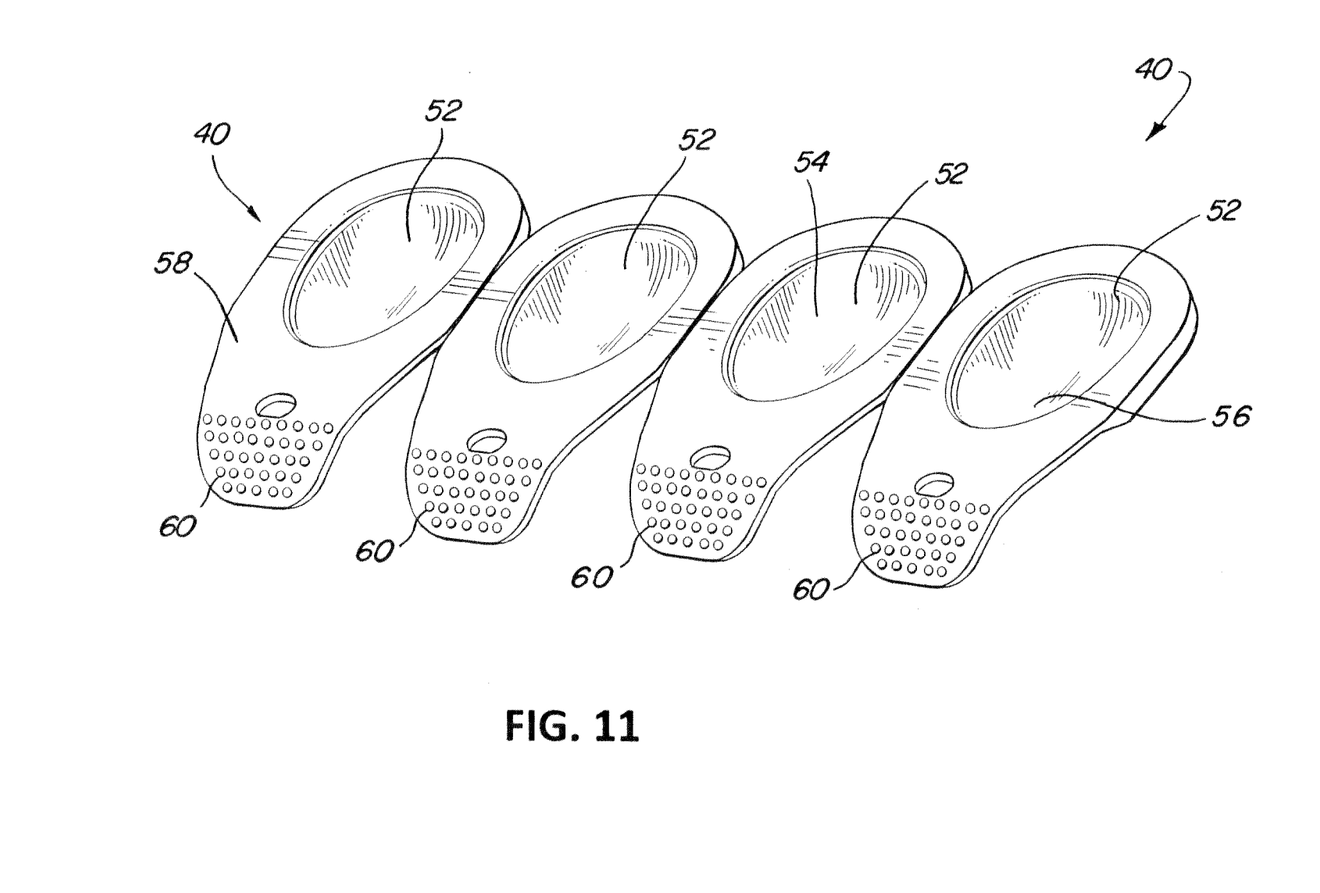
FIG. 11 is an array of blister packs usable with the infeed trays of the present invention.
Figure 12:
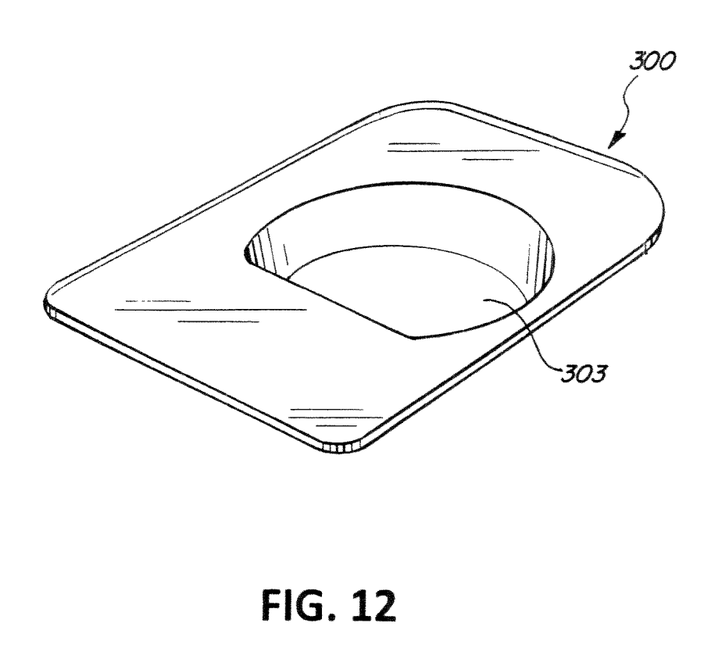
FIG. 12 is a perspective view of another blister pack usable with the infeed trays described herein.

Referring now to FIGS. 10 and 11, after the ophthalmic lenses are picked up and the pick and place robot 46 returns to the first working area 58, it is programmed with a coordinate that enables the pickup heads 64 to be positioned over and aligned with the cavities 52 of the blister packs 40 or the blister packs 300, as illustrated in FIG. 12. The blister packs are moved along the conveyor module 14 inside the infeed trays 36 and pre-filled with packing solution when passed through a dosing module. The pick and place robot 46 is then activated to be lowered along the y coordinate to lower the pickup heads in corresponding blister packs.

When the pickup head with the contact lens is located above the blister pack, the vacuum is turned off or is otherwise stopped. The lens can remain attached to the pickup head by the surface tension provided by the wet lens surface and the pickup head surface. The lens attached to the pickup head is then dipped into the packaging solution in the blister pack. Contacting the lens with the packaging solution results in the lens being released from the pickup head and becoming immersed in the packaging solution located in the blister pack.

In another embodiment, during the discharge operation, the pickup head 64 and the lens are both lowered below the surface of the packaging solutions before vacuum is turned off. Once turned off, the ophthalmic lens separates from the pickup head 64 and floats to the bottom of the blister pack. This process may be incorporated in combination with over-filling the blister pack with packaging solution and/or providing means to avoid sucking out all or a portion of the packaging solution.

FIG. 10 shows the blister packages 40 each with a peelable foil cover 136, as reflected by the reflective cross-hatchings. The foil covers 136 are placed over the blister packages after the ophthalmic lenses are placed therein, one lens per package.

In view of the disclosure herein, it can be appreciated that with the present trays 34 the ophthalmic lenses present in the liquid in the cavities of the trays 34 remain centered or substantially centered in the cavities. This self-centering is effective in reducing variability in lens position within the cavity and thereby reduces the potential that the pickup head will inadvertently miss the lens during the pick-up process. Ideally, the centering of the ophthalmic lens provided by the cavity results in zero misses by the pickup head and achieves a yield of 100% in a batch of lenses being transferred. As discussed herein, the cavity of the illustrated embodiment has a wavy or undulating conical sidewall that tapers from a wider dimension at the cavity opening to a narrower dimension near the bottom of the cavity. The cavity has a cylindrical bottom sidewall disposed between the conical sidewall and the bottom surface of the cavity. The bottom surface of the cavity can be defined by a spherical curve in the illustrated embodiment. In addition, by providing a wavy or undulating conical sidewall, it is possible that portions of the sidewall act as channels along which a liquid can flow.

Additionally, with the present pickup heads, it is now possible to pick up a wet hydrogel lens using vacuum pressure without damaging the lens, to control the amount of liquid transferred with the lens from the tray to the blister pack, or both. The reduced damage to the lens compared to other pickup heads used to transfer wet hydrogel lenses can be attributed to the unique bore design of the pickup head in which the vacuum pressure does not become excessive, causing dimpling and/or other damage to the lens. Similarly, in embodiments of the unique bore configuration with the ability to remove excess liquid during the transfer, the removal of excess liquid helps reduce contamination of the packaging liquid in the blister pack, and thereby assists in maintaining the predetermined conditions of the packaging liquid, such as the osmolarity of the packaging liquid. In the illustrated embodiment, the maximum amount of liquid transferred with the lens attached to the pickup head is 60 μL. However, it is possible that the amount of liquid is even less than 60 μL. Thus, in the illustrated embodiment, the amount of dilution of the packaging liquid is 4% or less resulting from the transfer of the lens and any residual liquid from the lens tray. With the present system, components and processes, it is possible to maintain the osmolarity of the packaging liquid at a value of about 325 mOsm plus/minus 10 mOsm. In other embodiments, the osmolarity of the packaging liquid is about 316 mOsm plus/minus 19 mOsm when the lens is inserted into the blister pack.

With the present pickup heads and trays, it is possible to also effectively center the lens in the recess of the blister pack since the original position of the lens in the tray cavity is known. The ophthalmic lenses can be transferred into a blister pack that already contains a liquid in the blister pack cavity to reduce bubble formation that may result from placing the lens and liquid in the blister pack. The centered lenses preferably do not contact the sidewalls of the blister pack cavities when located in the packaging liquid. By reducing the amount of contact between the lens and the blister pack cavity sidewall, it is easier to obtain a reliable image of the lens in the blister pack during a lens inspection procedure, and to reduce the number of detected defects that are false positives (i.e. resulting from the contact between the lens and the sidewall, as compared to actual defects of the lens).

Once in the blister pack cavity, the lenses can be inspected manually or automatically using cameras and various computer software programs configured to detect lens defects.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method of manufacturing an ophthalmic lens, comprising:
    providing an ophthalmic lens in a volume of liquid in a well of a lens carrier so that the ophthalmic lens is understood to be a wet lens;
    removing the wet lens from the well using a wet lens pick up head comprising an outer periphery sized and convexly shaped to form a fit with a posterior concave surface of the wet lens;
    moving the wet lens pick up head with the posterior surface of the wet lens fixed to the outer periphery of the wet lens pick up head toward a blister package having a cavity to receive the wet lens; and
    releasing the wet lens from the wet lens pick up head into the cavity of the blister package,
    wherein, during the moving, the wet lens is fixed to a first set of holes in the outer periphery of the wet lens pick up head and is retained by vacuum, and excess liquid is removed from the wet lens by a second set of holes recessed from the periphery of the wet lens pick up head that do not come in contact with the wet lens surface.

2. The method of claim 1, wherein the step of releasing the wet lens comprises releasing the wet lens into a volume of packaging solution.

3. The method of claim 1, wherein the lens pick up head comprises spaced apart wings, each wing comprising an end surface comprising a curved end profile and wherein the first set of holes are formed on the end surface and are used to apply a vacuum to the wet lens during moving the lens.

4. The method of claim 1, wherein the step of releasing the wet lens comprises releasing the lens in the volume of liquid in the well with a base curve of the lens facing up.

5. The method of claim 1, wherein a side wall portion of the well comprises an undulating and tapering surface effective in centering the wet lens in the well.

\* \* \* \* \*